United States Patent [19]
Orr

[11] Patent Number: 5,963,020
[45] Date of Patent: Oct. 5, 1999

[54] METHOD AND APPARATUS FOR PROVIDING POWER-ON-DEMAND TO AUXILIARY SYSTEMS ON AN EARTH MOVING MACHINE

[75] Inventor: David C. Orr, Dunlap, Ill.

[73] Assignee: Caterpillar Inc., Peoria, Ill.

[21] Appl. No.: 08/892,405

[22] Filed: Jul. 15, 1997

[51] Int. Cl.⁶ ............................................. H02P 9/04
[52] U.S. Cl. ................. 322/29; 290/14; 180/65.4
[58] Field of Search ........................ 290/14, 40 R, 290/40 B; 322/29, 14, 17; 180/65.4

[56] References Cited

U.S. PATENT DOCUMENTS

| | | | |
|---|---|---|---|
| 4,017,739 | 4/1977 | Hapeman et al. | 290/14 |
| 4,207,691 | 6/1980 | Hyler et al. | 37/124 |
| 4,587,436 | 5/1986 | Cronin | 307/21 |
| 4,635,743 | 1/1987 | Riehl | 180/243 |
| 4,663,937 | 5/1987 | Cullin | 60/431 |
| 4,809,803 | 3/1989 | Ahera et al. | 180/65.4 |
| 4,865,144 | 9/1989 | North | 180/79.1 |
| 4,905,134 | 2/1990 | Recker et al. | 363/98 |
| 4,912,618 | 3/1990 | Krinickas, Jr. | 363/37 |
| 5,387,859 | 2/1995 | Murugan et al. | 322/10 |
| 5,635,805 | 6/1997 | Ibaraki et al. | 318/139 |

OTHER PUBLICATIONS

Diesel Progress (Engines & Drives), "Generating Power at Any Speed?".
Diesel Progress (Engines & Drives), "Libby Expands Variable Speed Generator Set Line"—pp. 66 and 67.

*Primary Examiner*—Nestor Ramirez
*Assistant Examiner*—Nicholas Ponomarenko
*Attorney, Agent, or Firm*—Steve D. Lundquist; W. Bryan McPherson

[57] ABSTRACT

A method and apparatus for supplying electrical power in an earth moving machine is provided. The method and apparatus includes an engine adapted to deliver primary power at a variable speed to the earth moving machine. A hydraulic system is connected to and driven by the engine. The hydraulic system in turn is connected to and drives a work implement. A variable input speed, constant output generator system is connected to and driven by the engine at a variable speed. The generator delivers electrical power at a constant value independent of variations of the speed of the engine. There is at least one auxiliary system adapted to receive the electrical power.

10 Claims, 4 Drawing Sheets

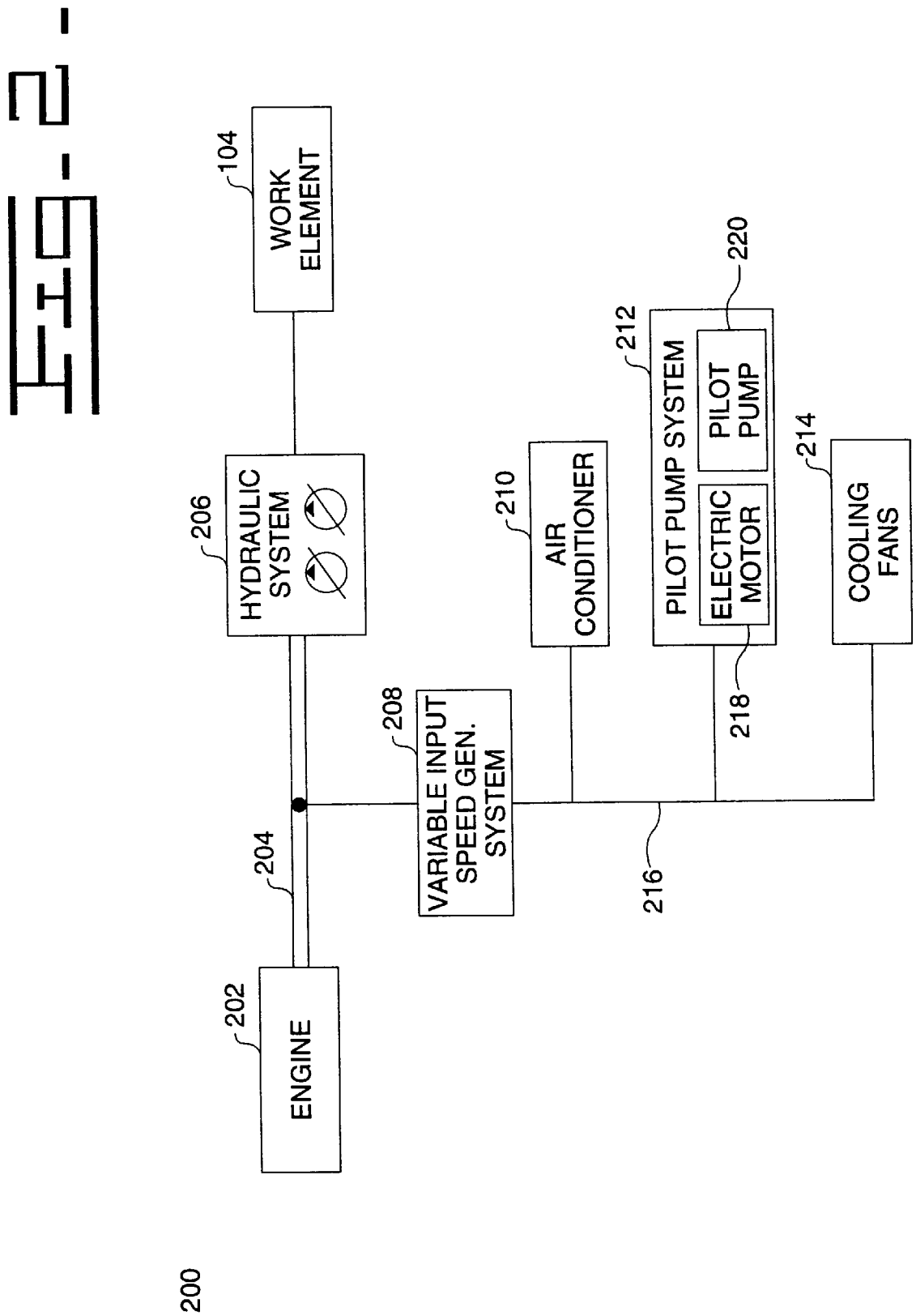

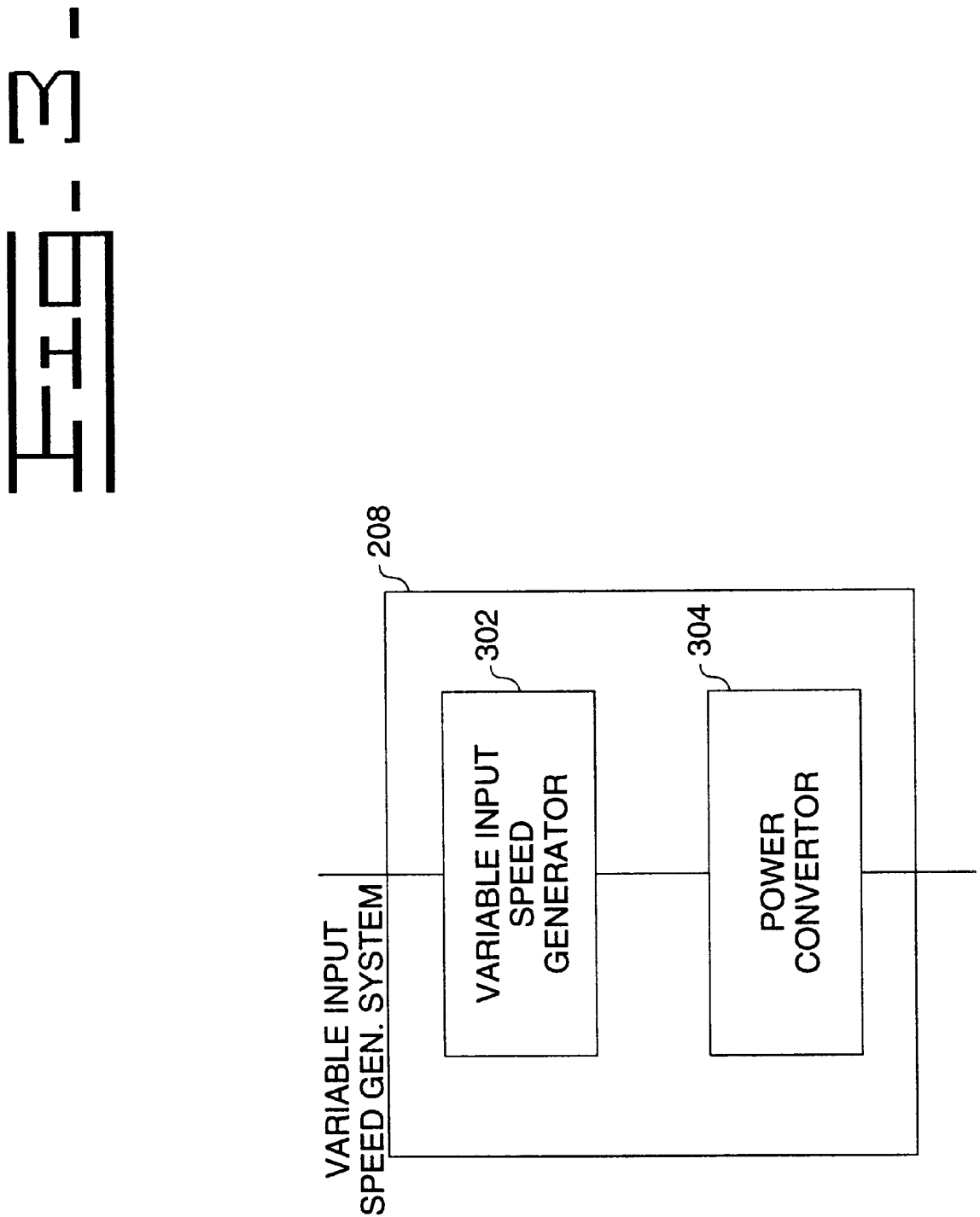

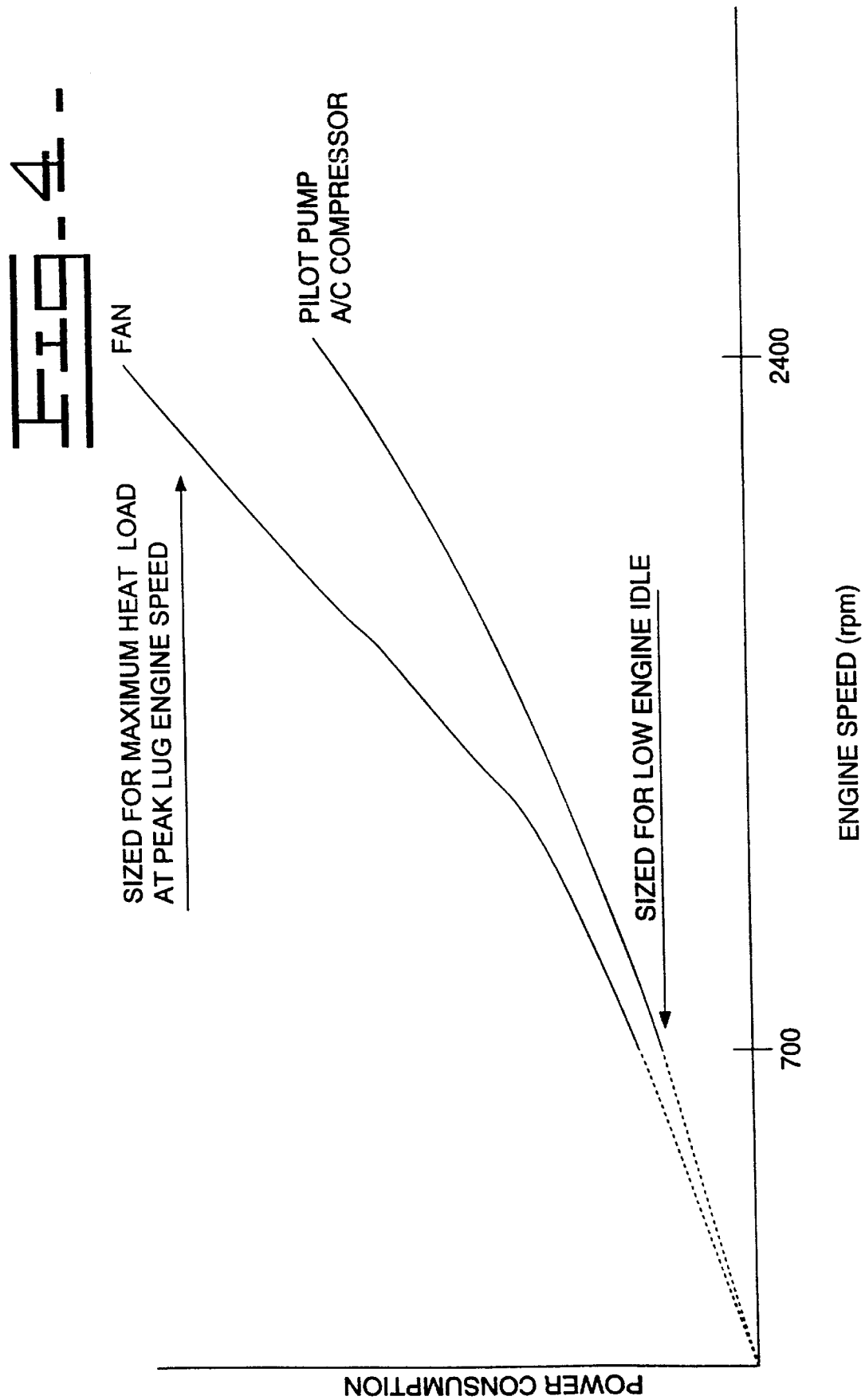

5,963,020

METHOD AND APPARATUS FOR PROVIDING POWER-ON-DEMAND TO AUXILIARY SYSTEMS ON AN EARTH MOVING MACHINE

TECHNICAL FIELD

The present invention relates generally to earthmoving machines, and more particularly, to a method and apparatus for providing power-on-demand to auxiliary systems on an earth moving machine, while the machine engine is running at varying speeds.

BACKGROUND ART

Current auxiliary systems on an earth moving machine, such as an air conditioner, cooling fans, or pilot pumps, are powered by the engine of the earth moving machine. The auxiliary systems are belt or gear driven systems which are connected to the engine. The auxiliary systems are driven at a speed dictated by the speed of the engine. For example, the speed of the engine can vary between low idle, i.e., 700 rpm, and high idle, i.e., 2400 rpm. The variance in the engine speed is dependent on the particular work function the earth moving machine is performing, as well as the load that the engine is experiencing.

An earth moving machine, such as an excavator, has a transmission system and a hydraulic system, both of which are driven by a drivetrain connected to the engine. The hydraulic system is connected to and drives a work implement, such as a boom, stick, and bucket. The load placed on the engine will vary in large part due to the current load or work function being performed by the work implement. Varying the engine speed to operate the work implement in a desired manner also varies the input power to the auxiliary systems. Therefore, a pilot pump for the hydraulic system, which is sized to provide a required flow at a low idle engine speed of 700 rpm, is forced to operate at engine speeds ranging from 700 rpm to 2400 rpm. The result is wasted power because the auxiliary system can not use all the available power provided by the engine.

The fact that these auxiliary systems are either belt or gear driven also means that they place a continuous load on the engine. If the engine is experiencing a heavy loading condition due to an increased bucket load, for example, there is currently no way to reduce the load of the auxiliary systems. If the load on the engine resulting from the auxiliary systems could be selectively reduced or momentarily eliminated, then more of the available engine power could be applied to operating the work implement when needed.

In addition, the fact that auxiliary systems are currently belt or gear driven restricts the possible placement of these systems on the current earth moving machines. Belt or gear driven systems currently need to be in close proximity to the drivetrain. The placement of the auxiliary systems effects design options when a new machine is being designed.

The present invention is directed toward overcoming one or more of the problems as set forth above.

DISCLOSURE OF THE INVENTION

In one aspect of the present invention, an apparatus for supplying electrical power in an earth moving machine is provided. The apparatus includes an engine adapted to deliver primary power at a variable speed to the earth moving machine. A hydraulic system is connected to and driven by the engine. The hydraulic system in turn is connected to and drives a work implement. A variable input speed generator system is connected to and driven by the engine at a variable speed. The generator system delivers electrical power independent of variations of the speed of the engine. There is at least one auxiliary system adapted to receive the electrical power.

In another aspect of the present invention, a method for supplying electrical power in an earth moving machine is provided. The earth moving machine includes an engine, a hydraulic system driven by the engine, and a work implement driven by said hydraulic system. The method includes the steps of operating the engine at a variable speed, and operating a variable input speed generator system connected to and driven by the engine at the variable speed. The generator system generates electrical power at a constant value independent of variations of the speed of said engine. In addition, the method includes the steps of: delivering the electrical power to an auxiliary system.

BRIEF DESCRIPTION OF THE DRAWINGS

FIG. 2 is a block diagram of an apparatus for performing the present invention;

FIG. 3 is a block diagram of a variable input, constant output system; and

FIG. 4 is a diagram illustrating the power consumption of two auxiliary systems at different engine speeds.

BEST MODE FOR CARRYING OUT THE INVENTION

Figure 1:
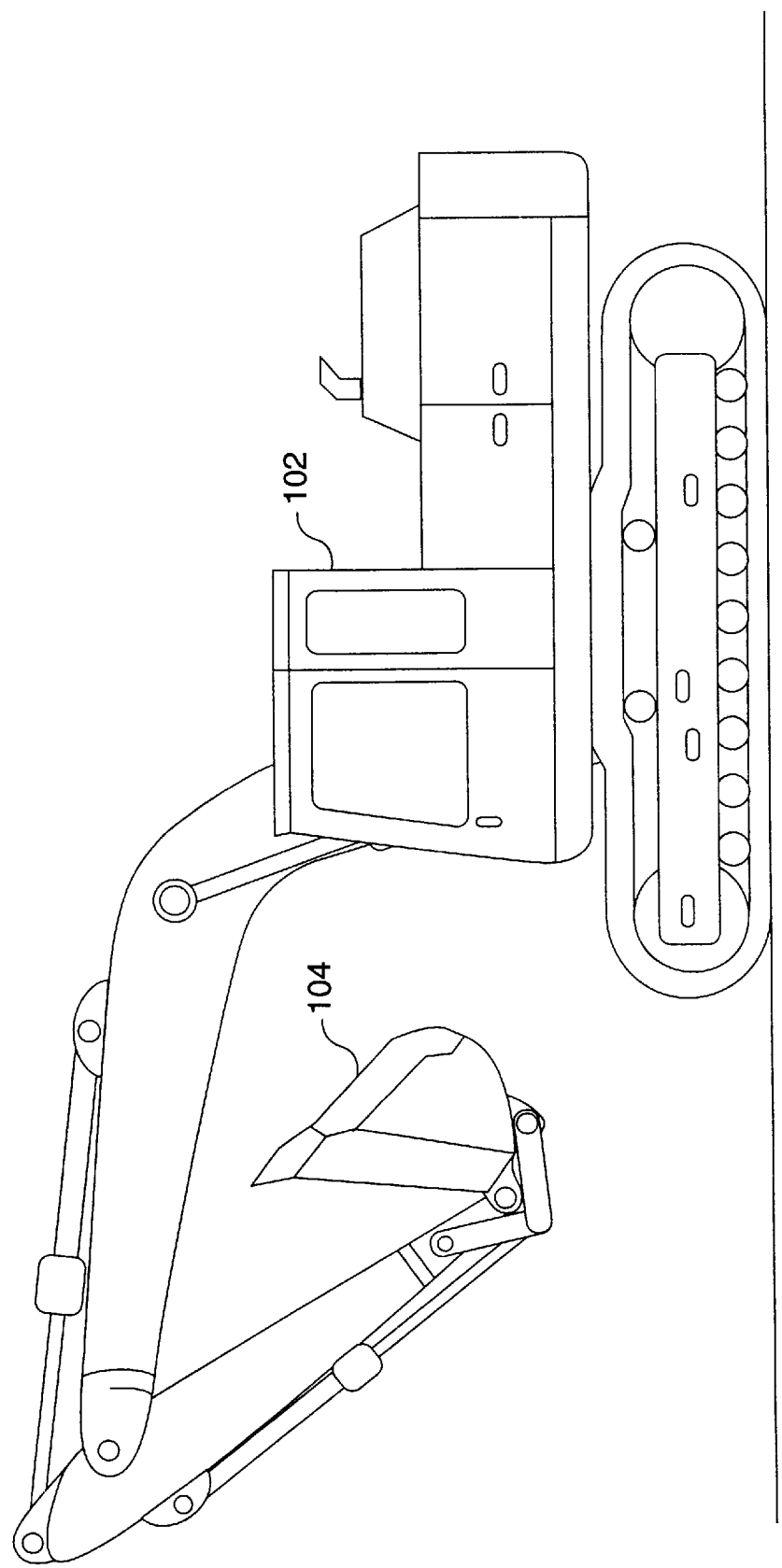
FIG. 1 is a diagrammatic illustration of an earthmoving machine operating at a work site.

With reference to the drawings, FIG. 1 shows a planar view of an earth moving machine 102 having work implement 104. The work implement 104 is utilized to move a load, most commonly being earth or soil.

For illustrative purposes, the earth moving machine 102 is shown as an excavator and the work implement 104 is shown as a boom, stick, and bucket. While the invention is described in conjunction with an excavator 102, it is intended that the invention also be used on other types of earth moving machines, such as other tracked and wheeled machines.

Reference is now made to FIG. 2, which shows a block diagram of the preferred embodiment of an apparatus 200 for supplying electrical power in an earth moving machine 102. The apparatus 200 includes an engine 202 located within the earth moving machine 102, and a drivetrain 204 connected to the engine 202. The engine 202 produces primary power for the earth moving machine 102 and delivers the power to the machine 102 through the drivetrain 204. The engine 202 runs at varying speeds; therefore, the primary power is delivered to the earthmoving machine 102 at a variable speed. A hydraulic system 206 is connected to and driven by the drivetrain 204. The hydraulic system 206 is connected to and drives the work implement 104. A variable input speed generator system 208 is connected to and driven by the engine through the drivetrain 204. The variable input speed generator system 208 is driven by the engine at a variable speed and produces a constant voltage, constant frequency output. At least one auxiliary system is connected to and receives electrical power from the variable input speed generator system 208. Examples of auxiliary systems include, an electrically driven air conditioner 210, an electrically actuated pilot pump system 212, and an electrically driven cooling fan 214. The pilot pump system 212 may include an electric motor 218 and a pilot pump 220.

In addition the generator system 208 powers the usual electric systems on current earth moving machines, such as lights (not shown), windshield wipers (not shown), and radios (not shown).

In the preferred embodiment the variable input speed generator system 208, includes a variable input speed generator 302 and a power converter 304, as shown in FIG. 3. The generator 302 receives mechanical power at a variable speed from the drivetrain 204 and converts the mechanical energy to electrical energy. The variable input speed generator 302 de-couples the engine speed from the voltage and frequency of output electrical power. The power converter 304 receives and conditions the electrical power produced by the generator 302 and produces a constant voltage, constant frequency output. Thus, even though the input mechanical power may vary between 700 rpm to 2400 rpm, the variable input speed generator system 208 produces electrical power at a constant voltage and a constant frequency. Examples of variable input speed generators include permanent magnetic rotor generators, and switched reluctance generators. In the preferred embodiment, a switched reluctance generator is used. Preferably, the power converter 302 is a resonant dc-link invertor capable of converting the output from the generator to a constant voltage, constant frequency signal output, e.g., a 240 volt, 60 Hz output signal. However, other types of power converters, such as an AC-DC-AC power converter may be used. In the preferred embodiment, the alternator is replaced by with the variable input speed generator system 206.

In application, the invention may be operated as follows. The engine 202 drives the hydraulic system 206, and therefore the work implement 104, at a desired speed. The engine 202 may also drive a transmission system (not shown). Typically, the engine 202 is operated at a desired speed that maximizes the efficiency of the work implement 104, while driving the transmission system. For example, the speed of the engine 202 may vary from 700 revolutions per minute (rpm) for low idle to 2400 rpm for high idle, dependent on the current work function and load of the work implement 104.

Additionally, the engine 202 drives the generator system 208. The generator system 208 includes a variable input speed generator 302 and a power converter 304. Accordingly, the generator 302 transforms the input mechanical power of the engine 202, to electrical power. Although the mechanical power may vary, by using a variable input speed generator 302, the electrical power produced by the generator system 208 will be constant both in frequency and in voltage. The output of the generator 302 is delivered to a power converter 304, which converts the electrical power to a constant voltage and constant frequency. The constant voltage and constant frequency is produced at a predetermined value to supply the auxiliary systems 210, 212, 214 with power, e.g.: 240 volts at 60 hertz. In the preferred embodiment, the predetermined value for the constant voltage and constant frequency is an optimum value which the auxiliary systems have been designed to use. The output of the power converter 304 is delivered to the auxiliary systems 210, 212, 214 through an electrical connection 216. An example of an electrical connection 216 is standard electrical wiring capable of conducting 240 volts at 60 hertz. Therefore, the auxiliary systems 210 can receive power at the required power levels. For example, the pilot pump 218 is driven by a 240V, 60 Hz electrical motor 220 regardless of the input speed to the variable input speed generator 302.

Industrial Applicability

As illustrated in FIG. 2, the claimed invention includes a variable input speed generator system 208 that is driven by the engine 202 at a variable speed and produces a constant voltage, constant frequency output. At least one auxiliary system is connected to and receives electrical power from the variable input speed generator system 208.

Improvements in productivity and efficiency of earth moving machinery can be achieved by driving various accessories at a desired speed or power level, rather than continuously driving the accessories at a wide range of fluctuating engine speeds. Shown in FIG. 5 is an illustration of the power consumption of two auxiliary devices, e.g., a fan 214 and air conditioner 210 plotted with respect to a variable engine speed. FIG. 4 illustrates the wasted power consumption that occurs when auxiliary accessories are designed to run at engine speeds from low engine idle through maximum engine loading.

Additionally, utilizing the variable input speed generator system 208 of the present invention enables the supply of more available engine power to the machine 102 at times of peak power demand. At times of peak power demand, some auxiliary devices such as electrically powered cooling fans, can be turned off momentarily; thereby, making more power available to the hydraulic circuits and transmission, thereby further increasing productivity of the earth moving machine.

While power savings is the most immediate benefit of integrating a variable input speed generator system 208 into a earth moving machine 102, additional long term benefits include the ability to design more efficient, power-on-demand, auxiliary devices with regard to power consumption and lower noise levels. In addition, the generator system 208 of the present invention enables more effective placement of auxiliary systems throughout the earth moving machine 102 since the auxiliary systems no longer have to be in close proximity to the drivetrain of the machine.

Other aspects, objects, advantages and uses of the present invention can be obtained from a study of the drawings, disclosure and appended claims.

I claim:

1. An apparatus for producing electrical power in an earth moving machine having a drivetrain, comprising:

an engine connected to said drivetrain and adapted to deliver primary power at a variable speed to said drivetrain;

a work implement located on said earth moving machine;

a hydraulic system connected to and driven by said drivetrain of said engine, said hydraulic system being adapted to drive said work implement;

a variable input speed generator system connected to and driven by said drivetrain at the variable speed, said generator system being adapted to produce electrical power at a constant voltage and constant frequency independent of variations of the speed of said engine; and at least one auxiliary system adapted to receive the electrical power from the generator system.

2. An apparatus, as set forth in claim 1, wherein said variable input speed generator system is adapted to deliver the electrical power when the power is needed by said at least one auxiliary systems, and said at least one auxiliary system is adapted to receive the electrical power at an predetermined value.

3. An apparatus, as set forth in claim 1, wherein said variable input speed generator system includes a variable input speed generator for delivering power independent of the variations of the speed of said engine.

4. An apparatus, as set forth in claim 3, where said variable input speed generator system includes a power converter, said power converter being adapted to receive said electrical power and responsively deliver an electrical power at a predetermined constant voltage and frequency.

5. An apparatus, as set forth in claim 1, further comprising a transmission system connected to and driven by said drivetrain of said engine.

6. A method for supplying electrical power in an earth moving machine, said earth moving machine including an engine and a work implement, including the steps of:

operating said engine at a variable speed;

operating a hydraulic system at the variable speed, said hydraulic system being connected to and driven by said engine, and said hydraulic system being connected to and driving said work implement, operating a variable input speed generator system connected to and driven by said engine at a the variable speed, said generator system producing electrical power independent of variations of the speed of said engine; and delivering the electrical power to at least one auxiliary system when said at least one auxiliary system needs the power.

7. A method, as set forth in claim 6, including the step of operating a transmission system at a variable speed, said transmission system being connected to and driven by said engine.

8. A method, as set forth in claim 7, wherein the steps of operating said engine includes the step of operating said engine at a desired speed for the driving of said at least one of said transmission system and said hydraulic system.

9. A method, as set forth in claim 6, wherein operating said generator system includes the step of operating a variable input speed generator, said generator producing electrical power at a value independent of variations of the speed of said engine.

10. A method, as set forth in claim 9, wherein operating said generator system includes the step of operating a power converter located within said generator system, said power converter receiving the electrical power and conditioning the electrical power to produce electrical power at a constant frequency and constant voltage, said constant frequency and constant voltage being provided at an predetermined value to said at least one auxiliary system.

\* \* \* \* \*